United States Patent [19]

Flesher et al.

[11] Patent Number: 5,110,859

[45] Date of Patent: May 5, 1992

[54] POLYMERS, THEIR PRODUCTION AND USES

[76] Inventors: Peter Flesher, "Littlebeck", Beck Lane, Bingley, West Yorkshire; David Farrar, 13 Greenfield Lane, Idle, Bradford, West Yorkshire, both of Great Britain

[21] Appl. No.: 602,920

[22] Filed: Oct. 19, 1990

Related U.S. Application Data

[63] Continuation of Ser. No. 125,960, Nov. 27, 1987, abandoned.

[51] Int. Cl.$^5$ ............................................. C08L 29/04
[52] U.S. Cl. .................................. 524/503; 524/557; 525/57; 525/60
[58] Field of Search .................. 524/503, 557; 525/57, 525/60

[56] References Cited

U.S. PATENT DOCUMENTS 4,618,648 10/1986 Marten ................................... 525/60
4,675,360 6/1987 Marten ................................... 525/60

FOREIGN PATENT DOCUMENTS 0036396 3/1979 Japan ..................................... 525/59
0743165 1/1956 United Kingdom ................. 525/60
1164361 9/1969 United Kingdom .

Primary Examiner—Joseph L. Schofer
Assistant Examiner—J. M. Reddick
Attorney, Agent, or Firm—Andrus, Sceales, Starke & Sawall

[57] ABSTRACT

Novel polyvinyl alcohols include, in the polymeric backbone, vinyl units containing pendant hydrophobic groups. The polymers are made by hydrolysis of corresponding polyvinyl acylates under conditions are avoid hydrolysis of the pendant hydrophobic groups from the polymer. These groups are preferably bonded into the polymer as allyl ether units. The hydrophobic units act as internal plasticizers in films or other shaped articles formed from the polymers and, in particular, gives significant benefit in viscosity and other rheology characteristics of aqueous compositions formed from the polymer.

5 Claims, No Drawings

POLYMERS, THEIR PRODUCTION AND USES

This application is a continuation of copending application Ser. No. 07/125,960, filed Nov. 27, 1987, now abandoned.

This invention relates to polyvinyl alcohols, their production, and their use in moulding compositions and, especially in aqueous thickening and sizing compositions.

Polyvinyl alcohol is a water soluble polymer that is made by hydrolysis of polyvinyl acetate. Despite the very wide usage of polyvinyl alcohol, there is general acceptance that it is not easily possible to alter its properties widely by simple variations in the monomer feed.

Attempts to modify the properties of polyvinyl alcohol by copolymerisation with a second monomer are well known but a difficulty is that the second monomer must be resistant to the hydrolysis conditions by which the vinyl alcohol is generated from the vinyl acetate or other monomer that is used for making the initial polymer. For instance typical ester monomers would be hydrolysed during the hydrolysis of the vinyl acetate groups.

Copolymers of vinyl acetate with allyl acetate have not proved very successful. Some copolymerisations of vinyl acetate, e.g., with vinyl versatate, are performed so as to reduce the degree of hydrolysis to polyvinyl alcohol.

One major use of polyvinyl alcohol is as an aqueous thickener or size and for these purposes the polymer must be highly hydrolysed and substantially or fully soluble in water. Other uses of vinyl alcohol polymers rely upon the polymer's film-forming capacities, e.g., from emulsions of partially soluble or insoluble polymer, and upon the properties of shaped articles formed from the polymer, e.g., by moulding, extrusion or casting.

A problem with polyvinyl alcohol aqueous compositions is that their rheology and viscosity properties are only achieved by the use of rather large amounts of polyvinyl alcohol. A problem with films and other shaped articles of polyvinyl alcohol is that they tend to be rather brittle unless plasticiser is present. Normal plasticisers are external plasticisers and a problem with these is that they are liable to migrate during or after formation of the film or article, as a result of which the flexibility may be different from what is intended.

It is known that the thickening properties of certain acrylic polymers can be improved by including pendant hydrophobic groups in the polymer, the improvement apparently being due to association between the hydrophobic groups in adjacent molecules. The polymers containing such groups are often referred to as associative thickeners.

GB No. 1,167,524 describes copolymers of at least one ethylenically unsaturated monomer with a comonomer that is, for instance, an acrylic ester or an allyl ether of a polyalkoxylated alcohol that may be aliphatic or aromatic. This polyalkoxylated alcohol thus provides the pendant hydrophobic groups. Particular allyl ethers of this general type, and copolymers formed from them, are also described in GB No. 1,273,552.

The comonomer with the ether or ester is said to be acrylic acid, acrylamide, vinyl pyrollidone or maleic anhydride or a blend of maleic anhydride with a compound which normally copolymerises in alternating sequence. The comonomers that are exemplified are acrylic acid, maleic anhydride, acrylamide and blends of maleic anhydride with methyl vinyl ether or with vinyl acetate or with styrene. In particular a water soluble copolymer of maleic anhydride, vinyl acetate and the allyl ether of ethoxylated lanolin is described in example 9 of GB No. 1,273,552 and a copolymer of maleic anhydride, vinyl acetate and polyethylene glycol monoallyl monocetyl ether is described in example 9 of GB No. 1,167,524.

The incorporation of the maleic anhydride in such copolymers will have a significant effect on the properties of them. For instance maleic anhydride depresses molecular weight. Also, the use of allyl ethers is consistent with the intention to obtain a low molecular weight as it is well known that allyl monomers tend to give copolymers of much lower molecular weight than acrylic or other vinyl monomers.

The products of those patents were mentioned as thickeners or for various other purposes but they have not proved commercially very successful. The commercial success of associative thickeners has been restricted primarily to polymers made by oil-in-water copolymerisation of, for instance, an ester formed between an unsaturated acid and a hydrocarbyl ether of a polyalkylene glycol with ethyl acrylate or other water insoluble monomer with methacrylic acid or other alkali soluble monomer. A typical disclosure is in EP No. 11806.

In U.S. Pat. No. 4,618,648 it is alleged that shaped articles are formed from a copolymer of vinyl alcohol units with acrylic ester units carrying a pendant hydrophobic group. The polymers are alleged to be made by hydrolysis of a polymer of the corresponding vinyl acetate and acrylic ester groups. The hydrophobic ester groups are alleged to be included for the purpose of plasticising the resultant shaped article.

We have confirmed that the shaped article is more plasticised if the polymer composition from which it is formed is made by hydrolysis of a copolymer of vinyl acetate units with the hydrophobic acrylic ester groups than from a homopolymer of the vinyl acetate units. However we have observed that the plasticising effect depends upon whether or not the hydrolysed polymer has been subjected to a purification stage and this proves that the effective hydrophobic moieties are not chemically attached to the polymer. It is clear that during the hydrolysis of the vinyl acetate units the hydrophobic acrylic ester units are also hydrolysed to form acrylic acid units in the polymer backbone and free surfactant alcohol molecules. The final product is a blend of a copolymer of vinyl alcohol with the hydrolysed acid units in physical admixture with an external plasticiser that is the hydrolysis product of the ester units, generally a surfactant alcohol. Thus, contrary to what is stated in U.S. Pat. No. 4,618,648, the vinyl alcohol polymer does not contain an effective amount of the hydrophobic vinyl ester units.

This invention relates to novel copolymers, and products containing them, formed of (a) 10 to 99% by weight recurring vinyl units in the polymer backbone and selected from vinyl alcohol and vinyl acylate units, at least 25 mole percent being vinyl alcohol units, (b) 0 to 50% by weight recurring vinyl units in the polymer backbone and derived from other ethylenically unsaturated copolymerisable monomer and (c) 1 to 90% by weight recurring vinyl units in the polymer backbone and derived from ethylenically unsaturated monomer that carries a pendant group —$A_mB_nA_pR$ wherein B is ethyleneoxy, n is an integer of at least 2, A is propyleneoxy or butyleneoxy, m and p are each an integer less than n, and R is a hydrophobic group containing at least 8 carbon atoms.

Thus, in the invention the vinyl alcohol polymer backbone does contain a substantial and effective amount of the hydrophobic units (c), in contrast to the polymers of U.S. Pat. No. 4,618,648.

Throughout this specification all percentages are by weight unless otherwise specified.

In this specification the acylate of vinyl acylate is the residue of a carboxylic acid which usually does not itself contain polymerisable ethylenically unsaturated groups.

By the invention it is possible to provide both polyvinyl alcohol polymers that give improved viscosifying properties in aqueous compositions, and polyvinyl alcohol polymers that give improved physical properties in films and moulded articles even after prolonged exposure to water.

In one preferred aspect of the invention a copolymer as defined above is substantially free of hydrolysis products derived from unit (c). In particular the product is generally substantially free of surfactant alcohol, although small amounts may be present as a result of having been present during initial manufacture of the polyvinyl acetate from monomer contaminated with the surfactant alcohol.

In another aspect of the invention, a copolymer as defined above comprises units (c) derived from allyl ether units. By using allyl ether units, in preference to acrylic ester units, for component (c) it is much easier to hydrolyse the polyvinyl acetate copolymer to a polyvinyl alcohol copolymer without hydrolysing the units (c).

In another aspect of the invention we provide an aqueous composition comprising a copolymer as defined above. The composition is preferably for use as a thickener or size. The composition is preferably free of hydrolysis products derived from unit (c) and unit (c) is preferably an allyl ether monomer. The composition may include a mixture of the novel polyvinyl alcohol and conventional polyvinyl alcohol.

Thus in one important aspect of the invention we provide novel aqueous compositions that are essentially polyvinyl alcohol thickeners or sizes but that are modified by the inclusion, within some or all of the polyvinyl alcohol chains, of unit (c), preferably allyl ether units (c). In such copolymers, the mole percent of the units (a) that are vinyl alcohol units is selected to ensure that the copolymer is soluble. Generally the amount is above 50% and usually at least 70 or 75%, preferably at least 85 or 90 mole percent.

Another important product according to the invention is a shaped article, or a film-forming composition, formed of the defined copolymer and that is preferably substantially free of external plasticiser. In such copolymers the proportion of vinyl alcohol units is sufficiently low that the product is shapable, and generally such that it is insoluble. Accordingly the amount is usually below 75%, typically about 25 to 70, preferably above 50, mole percent.

In another aspect of the invention a copolymer as defined above is formed by hydrolysis of the corresponding vinyl acylate copolymer by hydrolysis under conditions that do not hydrolyse units (c). When the units (c) are allyl ether units then the hydrolysis conditions can be conventional for vinyl acetate hydrolysis, but when the units (c) are acrylic ester units the hydrolysis conditions must be more gentle than usual.

Preferably n is at least 5 and most preferably at least 10 with best results generally being obtained when it is 10 or more, e.g., up to 20 or 50 or even 100. However lower values of n, e.g., down to 2, are sometimes satisfactory, especially when water solubility is unimportant or undesirable, for instance in film forming or moulding compositions.

The polyoxyethylene chain may be interrupted by oxypropylene groups but preferably m and p are each below 2, preferably zero. The properties of the final polymer can be controlled by appropriate selection of n, m, p and R.

R can be a polyoxyalkylene chain where the alkylene groups wholly or mainly are propylene or higher but preferably is a hydrocarbyl group. The hydrocarbyl group generally contains from 8 to 30, preferably 10 to 24 and most preferably 12 to 18 carbon atoms. It may be selected from alkyl, for instance octyl, lauryl or stearyl, aralkyl such as 2-phenyl-ethyl ($-C_2H_4Ph$), aryl such as naphthyl, alkaryl such as alkyl phenyl wherein the alkyl group generally contains 6 to 12 carbon atoms, cycloalkyl (including polycyclic alkyl groups), or mixtures of one or more such groups. Preferred hydrocarbyl groups are alkyl and alkaryl groups. Any of these groups may additionally be substituted provided the substituents do not render the pendant group hydrophilic to an extent that the desired improvement in properties due to the hydrophobic group is lost.

The ethylenically unsaturated monomer (c) carrying the group $-A_mB_nA_pR$ is preferably a monomer of the formula

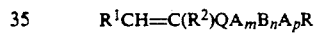

where
A, B, n, m, p and R are as defined above and
$R^1 = COOR^3$ or $QA_mB_nA_pR$ when $R^2 = H$ and $Q \neq CH_2O$ or O or $OR^5O$
or $R^1 = H$;
$R^2 = H$ or $CH_3$ or
$R^2 = CH_2COOR^3$ and $Q \neq CH_2O$ or O or $OR^5O$ or
$R^2 = CH_2QA_mB_nA_pR$ and $Q \neq CH_2O$ or O or $OR^5O$;
$R^3 = H$ or $C_1$-$C_8$ alkyl;
$Q = O$ or $OR^5O$ provided that $R^1$ and $R^2 = H$ or
$Q = CH_2O$, COO or $CONR^4$ where $R^4 = H$ or $CH_3$ and $R^5 = C_{1-4}$ alkylene The hydrophobic group can therefore be introduced as, for instance, an acrylic amide or, preferably, as an acrylic ester of a surfactant alcohol, or other group. Suitable monomers for providing units (c) are described in, for instance, EP Nos. 48094 or 63018, U.S. Pat. Nos. 4,423,199 or 4,524,175, JP No. 60-235815A or EP No. 11806, 13836 or 109820. Preferably however the hydrophobic group is introduced as an allyl ether of a surfactant alcohol.

Thus the monomer preferably has the formula $CH_2 = CR'CH_2OA_mB_nA_pR$ where R' is hydrogen or methyl. Flocculant polymers containing such units have been described by us in EP No. 0172723 and further polymers containing such units, and the synthesis of such units, are described in EP No. 0216479 and EP No. 0213800, both of which were unpublished at the priority date of this application.

The polymer is generally free of units (b) although such units can be included either as diluents or to impart a desired property modification. The copolymerisable monomer, if present, is normally an ethylenically unsaturated monomer. It can be an allyl monomer, for instance allyl alcohol that is present in the polymer as a result of hydrolysis of a polymer containing allyl acetate, but is generally a vinyl monomer. Vinyl monomers that depress molecular weight, e.g. maleic anhydride, are generally undesirable and so any comonomer (b) is preferably an acrylic monomer that can copolymerise with monomer (c) and vinyl acetate or other precursor units for (a) and that will resist the hydrolysis conditions. Typical examples include (meth) acrylic acid, butyl methacrylate and allyl sulphonate.

The units (a) will consist solely of vinyl alcohol units if hydrolysis of the vinyl acylate units that were initially copolymerised has been taken to completion. Otherwise some of the vinyl acylate units, e.g. 5 to 30 mole percent, will remain in the final polymer, the other units having been hydrolysed to vinyl alcohol.

Vinyl acylate units that may be copolymerised with the monomer to provide units (a) can be any of the vinyl acylate units that are known to be suitable for polymerisation and subsequent hydrolysis to make polyvinyl alcohol. Thus they can be selected from vinyl esters of optionally substituted aromatic carboxylic acids and optionally substituted alkanoic acid, for instance vinyl formate, benzoate, chloroacetate, dichloroacetate, bromoacetate and trifluoroacetate but preferably vinyl acetate is used as the monomer.

The relative amounts of monomers (a),(b) and (c) will be selected having regard to the desired properties. The amount of monomer (b) is generally zero or preferably, less than 20 per cent by weight. The amount of monomer (c) is typically 3 to 50 per cent by weight, often 5 to 30 per cent by weight. The balance is monomer (a). If unit (b) is present, preferably substantially all of it was present in the starting vinyl acylate polymer. Thus preferably substantially none of unit (b) is formed by hydrolysis of units (c) during the hydrolysis of the vinyl acylate groups. Preferably the polymer is free of any unit (b) that could have been formed by hydrolysis of units (c). When these units are acrylic ester, preferably the polymer is free of acrylic acid units.

The copolymerisation of vinyl acylate units with the other monomers may be conducted by any of the techniques known for the production of polyvinyl acetate and include bulk, suspension, solution and emulsion polymerisation.

The resulting polymer may then be converted to the polyvinyl alcohol by acidic hydrolysis, basic hydrolysis or methanolysis. The conversion can be conducted in any conventional manner that does not cause hydrolysis of units (c). Naturally the hydrolysis conditions must be selected such that the units (c) are not hydrolysed. Conventional hydrolysis conditions include reaction with aqueous alkali, aqueous alkali in methanol, aqueous alkali in acetone, or alkali in methanol, or by reaction with aqueous acid or acid in methanol. The polymer may be hydrolysed while in solution or suspension. The alkali is usually sodium hydroxide but may be ammonia or an amine. Hydrolysis may be effected at temperatures of 10° to 180 ° C., generally 20° to 100° C. (optionally under elevated or reduced pressure) for a reaction time that is sufficient to give the desired degree of hydrolysis.

It is surprising that it is possible to conduct hydrolysis without hydrolysing the pendant group —$A_m B_n A_p R$. The use of the allyl ether groups as monomer (c) is particularly advantageous as a result of their high resistance to hydrolysis. It is also possible to expose other units (c) to gentle hydrolysis conditions without hydrolysing them.

The risk of hydrolysis of units (c), (especially acrylic or other ester units), can be eliminated or reduced by selection of appropriate hydrolysis, e.g., controlled acidic or methanolic hydrolysis.

If the particular vinyl acylate units in the starting polymer necessitate the use of hydrolysis conditions under which the units (c) are prone to hydrolyse, then it is desirable to use a more easily hydrolysable vinyl acylate. The use of vinyl formate groups in preferance to vinyl acetate or other groups can be very suitable as these groups are very easily hydrolysed in water.

The polymer is generally linear but it can be cross-linked either while it is still in the form of an emulsion or solution or after it has been shaped into a film, coating or fibre. Cross-linking can be caused by reaction through the hydroxyl groups, e.g. by reaction with glyoxal after hydrolysis or a polyethylenically unsaturated monomer may be used in a small amount, e.g. 10 to 1000 ppm, as part or all of monomer (b).

When the novel polymer is to be used for forming shaped articles (e.g., when it is to be provided as a film-forming composition) the polymer may be formulated in an insoluble or partially insoluble form, as a result of having a rather low degree (e.g., below 70%) of hydrolysis of units (a) and/or as a result of having a rather low value of n or a rather high percentage of units (c). Aqueous compositions of such polymers may be in the form of emulsions in water. The polymer generally has a molecular weight up to 5 million, typically up to 3 million. The polymer can be formulated in the same manner as conventional polyvinyl alcohols are formulated for film-formation or other production of shaped articles. Blends with conventional polyvinyl alcohols can be used, and the shapable compositions can include other components, for instance plasticisers and other property modifiers. If there is any additional plasticiser, preferably it is substantially free of surfactant alcohol of the type obtainable by hydrolysis of units (c). The polymer may be shaped into films, coatings, fibres or any other shaped articles in conventional manner.

Preferred compositions of the invention are aqueous compositions in which the polymer is partially or, preferably, wholly soluble in water. Preferred compositions are sizing compositions and aqueous thickeners. The rheology characteristics of such compositions can, as a result of the inclusion of units (c), be very greatly improved compared to conventional polyvinyl alcohol compositions. Indeed the improvement in viscosity may be so great that the amount of polymer required can be much less than conventional. Instead of or in addition to reducing the amount of polymer it can be desirable to blend the novel polymer with conventional polyvinyl alcohol (or starch or other conventional natural or synthetic polymer), the amount of novel polymer typically being 5 to 90%, often 20 to 60%, by weight of the blend of novel and conventional polyvinyl alcohol.

When the composition is intended primarily as a thickener the molecular weight is often up to 3 million, 5 million or even higher. It is generally at least 100,000, preferably at least 1 million. When the composition is to be used as a size then lower molecular weights may be appropriate, but usually the molecular weight is above 1,000.

The aqueous compositions can be formulated in conventional manner using conventional additives. The concentration of the novel polyvinyl alcohols in any compositions containing them is generally at least 0.1% and is usually below 20%, typically up to about 10 or 15%, when the composition is an aqueous composition.

The polymers can be used wherever polyvinyl alcohol is used at present and, especially, in those uses where a higher viscosity would be desirable. Suitable uses are sizes for textiles, aqueous adhesives, e.g. for paper, wood, or fabrics, aqueous viscosifiers e.g. for aqueous paints and other water based systems including aqueous down hole liquids, transfer additives and release agents, and in the production of plasticised films and fibres.

The following are examples.

EXAMPLE 1

A vessel containing 100 g water, 1 g surfactant, 6 g hydroxyethyl cellulose and 0.3 g ammonium persulphate was degassed with nitrogen for 30 minutes and heated to 70° C. 200 g vinyl acetate was gradually blended with 200 g water, 0.6 g ammonium persulphate and 2 g surfactant and added over 3 hours via a predisperser to the vessel. A further 0.1 g ammonium persulphate was then added and the vessel was held at 70° C. for a further hour. The resultant emulsion was cooled and filtered to give a 40° solids emulsion.

The emulsion was then dried in an oven at 70° C. for 24 hours and 200 g of the resultant polyvinyl acetate solids were dissolved in a blend of 300 g acetone, 50 g methanol, 25 g water and 20 g concentrated hydrochloric acid and allowed to stand for three days. The product turned solid and was soluble in water, thus indicating hydrolysis to polyvinyl alcohol. A 5 per cent solution was prepared and had a viscosity, measured on a Brookfield RVT viscometer spindle 3, 10 rpm, of 150 cPs.

When the process was repeated replacing the 200 g vinyl acetate with 180 g vinyl acetate and 20 g of the ether formed between allyl alcohol and stearyl alcohol 10-ethoxylate the viscosity was 1750 cPs.

EXAMPLE 2

A range of vinyl acetate (co)polymers was prepared according to the following general procedure.

Stage 1: Polymer preparation

A reaction vessel fitted with a stirrer, thermometer condenser and nitrogen bubbler was placed in a water bath thermostated at 70° C. Then 390 g t-butanol was added and degassed for 10 minutes with $N_2$. A monomer feed comprising 2.0 g AZDN dissolved in 36 g vinyl acetate was pumped into the reaction vessel over a period of 5 minutes. After the initial feed had been added the contents of the vessel were allowed to react for a period of 10 minutes. After this a monomer feed comprising 2.0 g AZDN dissolved in 364 g vinyl acetate alone or blended with second monomer, 200 g t-butanol was added to the reaction vessel over a period of 165 minutes. After completion of the monomer feed, the reaction mix was held at 70° C. for 15 minutes and then 0.5 g AZDN dissolved in 10 g t-butanol was added, with the temperature being maintained at 70° C. for a further 45 minutes after which the solution was cooled to leave a 40% active polymer in t-butanol.

Stage 2: Polymer hydrolysis 1000 g of polymer solution prepared according to the procedure in Stage 1 was stirred into 1000 g methanol using a Silverson mixer. To this solution was then added 4.0 g NaOH dissolved in 80 g methanol. Agitation was continued until the onset of gellation/phase separation, when the stirrer was removed. After being left to stand for a further 15 minutes the gel was comminuted into 1000 g methanol containing 10.0 g concentrated HCl using a Silverson mixer fitted with a high shear head. This produced a fine particle size slurry of the polymer in methanol/butanol which was then filtered and vacuum dried to leave a pale yellow glassy solid.

The degree of hydrolysis for the polymer was determined according to the method given in "Polyvinyl alcohol: Properties and Applications" ed C. A. Finch p. 565/566.

Some of these products were used unwashed, that is the product was dissolved into water to form a viscous solution which was cast into a film to allow its extension at break to be determined. Other products were washed. These were made by dissolving the "unwashed" products from their powder form into water. The polymeric component was then isolated by adding acetone until a precipitate was observed. This was then recovered by vacuum filtration. In this way, any unpolymerised surfactant monomer, or any surfactant group which had been cleaved from the polymer backbone during hydrolysis, could be separated from the base polymer. The free surfactant remains soluble in the water/acetone continuous phase. They were then tested as before.

In the tables below allyl indicates the monomer $C_{18}H_{37}(EO)_{20}-O-CH_2CH=CH_2$ while acrylic indicates the monomer

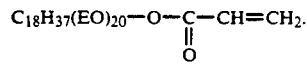

EO is $-O-CH_2CH_2-$. The results are as follows.

TABLE 1

| Monomer c | Washed | Extension at Break |
|---|---|---|
| 10% allyl | no | 180 |
| 10% allyl | yes | 201 |
| 10% acrylic | no | 278 |
| 10% acrylic | yes | 95 |

It is apparent that the allyl ether product gives a film whose extension at break is substantially unchanged by washing, this confirming that there is no external plasticiser. The acrylic product however gives a film whose extension at break decreases significantly on washing. This shows that the polymer does not contain the $C_{18}$ units chemically bonded into it. Instead the polymer is merely physically blended with the corresponding surfactant alcohol, which thus serves as external plasticiser.

Some of the products produced as above were dissolved in water and the viscosity of a 5% solution was tested. The results are shown in Table 2.

TABLE 2

| Monomer c | Washed | Viscosity 5% conc mPas |
|---|---|---|
| absent | no | 23 |
| 10% allyl | no | 17500 |
| 10% acrylic | no | 24 |
| 10% acrylic | yes | 27 |

The results show that the acrylic product, both washed and unwashed, has a viscosity of the same order as that of the vinyl alcohol polymer free of monomer (c). This indicates that there are no side chains in the polymer to give an associative thickening effect. In contrast, the ally product has clear associative thickening properties.

We claim:

1. An aqueous polyvinyl alcohol composition consisting essentially of water and a polyvinyl alcohol composition in which the polyvinyl alcohol is a polymer formed of
   (a) 10 to 99% by weight recurring vinyl units in the polymer backbone and selected from vinyl alcohol and vinyl acylate units, above 50 mole percent being vinyl alcohol units,
   (b) 0 to 50% by weight recurring vinyl units in the polymer backbone and derived from other ethylenically unsaturated copolymerisable monomer, characterized in that the polymer is also formed of
   (c) 1 to 99% by weight recurring vinyl units in the polymer backbone and derived from an allyl ether monomer that carries a pendant groups—$A_mB_nA_pR$ wherein B is ethyleneoxy, n is an integer of at least 2, A is propyleneoxy or butyleneoxy, m and p are each an integer less than n, and R is a hydrophobic group containing at least 8 carbon atoms.

2. An aqueous composition according to claim 1 in which the polymer is substantially free of any unit (b) obtained by hydrolysis of units (c).

3. An aqueous composition according to claim 1 in which the polymer is water soluble, and at least 70% mole percent of the units (a) are vinyl alcohol units and in which n is at least 5 and m and p are each zero.

4. An aqueous composition according to claim 1 in which R is selected from alkyl, aralkyl, alkaryl and cycloalkyl, and m and p are both zero.

5. An aqueous composition according to claim 1, also comprising a polyvinyl alcohol free of units (c).

* * * * *

UNITED STATES PATENT AND TRADEMARK OFFICE
CERTIFICATE OF CORRECTION

PATENT NO. : 5,110,859

DATED : May 5, 1992)

INVENTOR(S) : PETER FLESHER ET AL

It is certified that error appears in the above-identified patent and that said Letters Patent is hereby corrected as shown below:

Claim 3, Line 2 ;
(Col. 10, Line 12)   After "70" delete "%"

Signed and Sealed this

Twentieth Day of July, 1993

Attest:

MICHAEL K. KIRK

Attesting Officer   Acting Commissioner of Patents and Trademarks